(12) United States Patent
Thomas, III et al.

(10) Patent No.: US 12,655,960 B2
(45) Date of Patent: Jun. 16, 2026

(54) NEAR-LIGHT ILLUMINATION

(71) Applicant: Hewlett-Packard Development Company, L.P., Spring, TX (US)

(72) Inventors: Fred Charles Thomas, III, Fort Collins, CO (US); Santiago Garcia-Reyero Vinas, San Diego, CA (US); Miles Maxwell Claver, Fort Collins, CO (US); Lisa Marie Tesdahl, Fort Collins, CO (US); Aaron Jeffrey Huskerson, Fort Collins, CO (US); Joshua Alan St. John, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 139 days.

(21) Appl. No.: 18/785,682

(22) Filed: Jul. 26, 2024

(65) Prior Publication Data

US 2026/0029106 A1 Jan. 29, 2026

(51) Int. Cl.
| | |
|---|---|
| *F21V 13/12* | (2006.01) |
| *F21V 5/00* | (2018.01) |
| *F21V 9/14* | (2006.01) |
| *F21Y 115/10* | (2016.01) |
| *G01J 1/08* | (2006.01) |
| *G01J 1/44* | (2006.01) |
| *G02B 5/02* | (2006.01) |

(52) U.S. Cl.
CPC .............. *F21V 13/12* (2013.01); *F21V 5/007* (2013.01); *F21V 9/14* (2013.01); *G01J 1/08* (2013.01); *G01J 1/44* (2013.01); *G02B 5/0278* (2013.01); *F21Y 2115/10* (2016.08)

(58) Field of Classification Search
CPC .. F21V 13/12; F21V 5/007; F21V 9/14; G01J 1/08; G01J 1/44; G02B 5/0278; F21Y 2115/10
See application file for complete search history.

(56) References Cited

U.S. PATENT DOCUMENTS

2006/0176696 A1* 8/2006 Hough ...................... F21V 9/40
362/268
2014/0254141 A1* 9/2014 McRae ............... G09F 13/0413
362/97.1

\* cited by examiner

*Primary Examiner* — Seung C Sohn
(74) *Attorney, Agent, or Firm* — Quarles & Brady LLP

(57) ABSTRACT

The disclosed technology is directed to an illuminator for enabling near-light photometric imaging. In some examples, a near-light photometric imaging apparatus can include an illuminator comprising a lamp that comprises a plurality of light sources, an edge-blending film, and a first light-shaping diffuser. The plurality of light sources can have a color temperature having an approximately constant value as a brightness of the plurality of light sources is changed. The edge-blending film may condition light emitted at an outer perimeter of the lamp to soften a light edge, and the first light-shaping diffuser may comprise a first diffusing angle to diffuse light emitted from an interior region of the lamp to reduce a presence of hotspots in a target area.

20 Claims, 8 Drawing Sheets

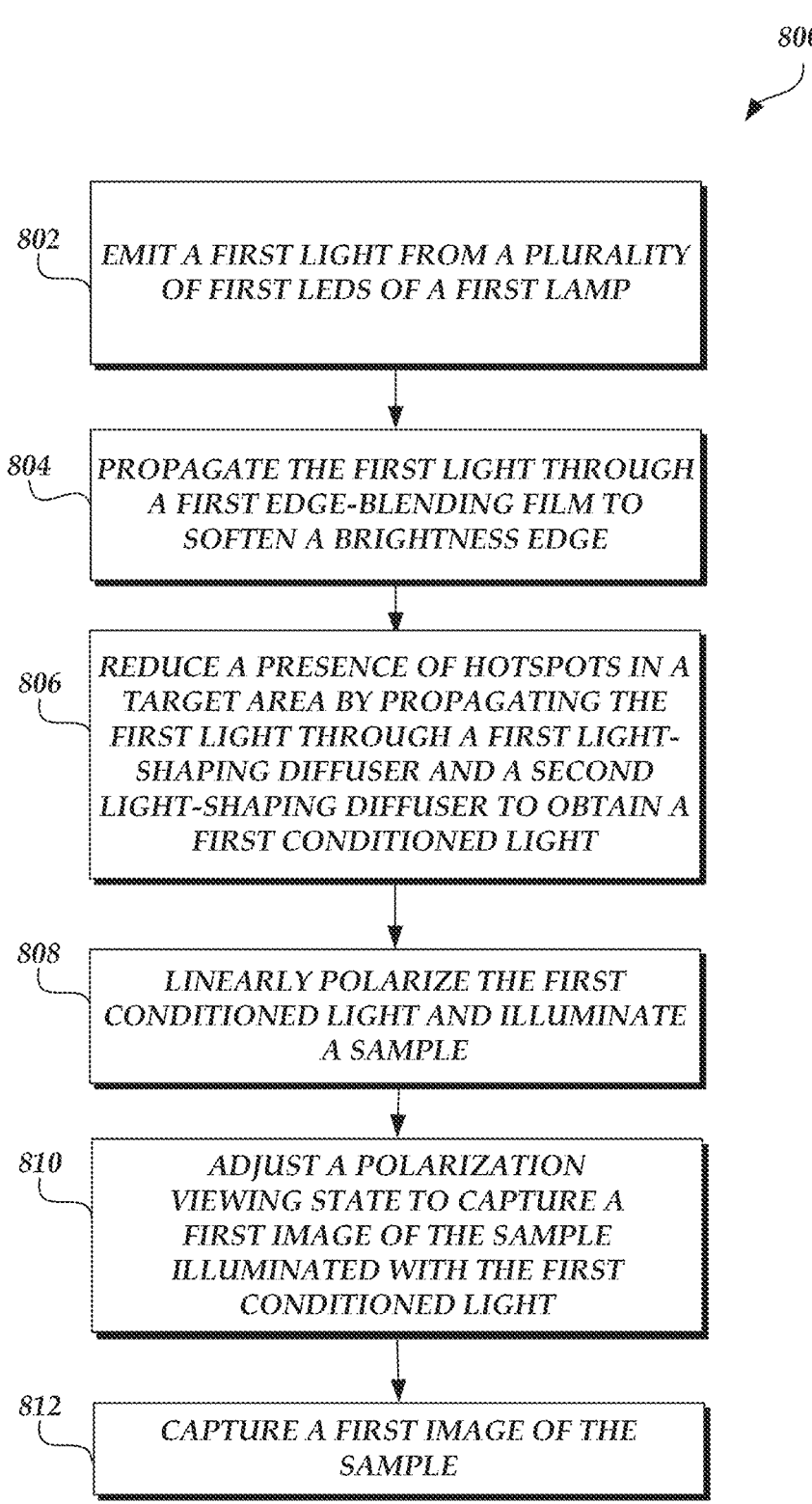

*800*

802 — EMIT A FIRST LIGHT FROM A PLURALITY OF FIRST LEDS OF A FIRST LAMP

804 — PROPAGATE THE FIRST LIGHT THROUGH A FIRST EDGE-BLENDING FILM TO SOFTEN A BRIGHTNESS EDGE

806 — REDUCE A PRESENCE OF HOTSPOTS IN A TARGET AREA BY PROPAGATING THE FIRST LIGHT THROUGH A FIRST LIGHT-SHAPING DIFFUSER AND A SECOND LIGHT-SHAPING DIFFUSER TO OBTAIN A FIRST CONDITIONED LIGHT

808 — LINEARLY POLARIZE THE FIRST CONDITIONED LIGHT AND ILLUMINATE A SAMPLE

810 — ADJUST A POLARIZATION VIEWING STATE TO CAPTURE A FIRST IMAGE OF THE SAMPLE ILLUMINATED WITH THE FIRST CONDITIONED LIGHT

812 — CAPTURE A FIRST IMAGE OF THE SAMPLE

*FIG. 8*

NEAR-LIGHT ILLUMINATION

BACKGROUND

Photometric imaging devices facilitate the acquisition of information, which can be used in subsequent processes (e.g., rendering processes). Photometric techniques can include photometric stereo, in which the information acquired pertains to the surface of a material (e.g., sample) as the surface is under different lighting conditions. The type of light source used and the relative position of the light source with respect to the material can result in uneven light distribution across the material, the appearance of hotspots (or specular highlights), and sharp transitions from light to background. Such artifacts can negatively impact the quality of the resulting image data.

SUMMARY

The systems, methods, and devices of this disclosure each have several innovative aspects, no single one of which is solely responsible for all of the desirable attributes disclosed herein. Details of one or more implementations of the subject matter described in this specification are set forth in the accompanying drawings and the description below.

In some aspects, the techniques described herein relate to an illuminator including: a lamp including a plurality of light sources, wherein each light source of the plurality of light sources includes a color temperature having an approximately constant value as a brightness of the light source is changed; an edge-blending film to condition light emitted at an outer perimeter of the lamp to soften a light edge; and a first light-shaping diffuser including a first diffusing angle to diffuse light emitted from an interior region of the lamp, wherein the edge-blending film is between the plurality of light sources and the first light-shaping diffuser.

In some aspects, the techniques described herein relate to an illuminator, wherein the edge-blending film includes at least one of a dot pattern film or a gradient transmissive neutral density film.

In some aspects, the techniques described herein relate to an illuminator, further including optical lenses disposed over the plurality of light sources, the optical lenses to generate an altered light distribution of an initial light distribution output by the plurality of light sources.

In some aspects, the techniques described herein relate to an illuminator, further including a second light-shaping diffuser including a second diffusing angle, wherein the first diffusing angle is lower than the second diffusing angle, and wherein the second light-shaping diffuser diffuses light diffused by the first light-shaping diffuser.

In some aspects, the techniques described herein relate to an illuminator, wherein the plurality of light sources includes a plurality of light emitting diodes, and wherein the plurality of light emitting diodes includes between 5 light emitting diodes and 200 light emitting diodes.

In some aspects, the techniques described herein relate to an illuminator, wherein the color temperature is in a range between approximately 4,500 K and 10,000 K.

In some aspects, the techniques described herein relate to an illuminator, wherein the plurality of light sources includes a color rendering index having a value in a range between approximately 85% and 100%.

In some aspects, the techniques described herein relate to an illuminator, further including a color neutral polarizer to facilitate a transmission of light from the plurality of light sources, wherein the color neutral polarizer is a linear polarizer film having a vertically oriented transmission axis, and wherein the first light-shaping diffuser is between the edge-blending film and the color neutral polarizer.

In some aspects, the techniques described herein relate to an illuminator, further including an anti-reflective film on a front surface of the lamp, wherein light is transmitted from the lamp through the front surface.

In some aspects, the techniques described herein relate to a near-light apparatus, including: a housing defining an inner volume; a target area disposed within the inner volume, the target area to receive a sample; and a first lamp positioned within the inner volume, the first lamp to emit an approximately uniform light towards a sample, the first lamp including: a plurality of light sources; an edge-blending film to condition light emitted at an outer perimeter of the first lamp to soften a light edge; and a first light-shaping diffuser including a first diffusing angle to diffuse light emitted from an interior region of the first lamp.

In some aspects, the techniques described herein relate to a near-light apparatus, further including a second lamp positioned within the inner volume, the second lamp to emit an approximately uniform light towards the sample, the second lamp including a second plurality of light sources, a second edge-blending film to condition light emitted at a second outer perimeter of the second lamp to soften a second light edge, and a second light-shaping diffuser including a second diffusing angle to diffuse light emitted from a second interior region of the second lamp, wherein the first lamp illuminates the sample from a first orientation and the second lamp illuminates the sample from a second orientation different from the first orientation, wherein the first lamp and the second lamp do not emit light towards the sample at a same time.

In some aspects, the techniques described herein relate to a near-light apparatus, further including an imaging device to capture images of the sample illuminated by at least the first lamp and the second lamp, wherein the imaging device is parallel to an imaging axis perpendicular to the target area and placed a first distance away from the target area.

In some aspects, the techniques described herein relate to a near-light apparatus, further including a controller to operate the first lamp at a first light setting, wherein the first light setting comprises at least one of an orientation of the first lamp and a brightness of the first lamp.

In some aspects, the techniques described herein relate to a near-light apparatus, wherein the plurality of light sources includes a plurality of light emitting diodes having an approximately constant color temperature, wherein the approximately constant color temperature is in a range of 4,500 K to 10,000 K.

In some aspects, the techniques described herein relate to a near-light apparatus, wherein the housing includes a first portion movably coupled to a second portion, wherein the first portion includes the first lamp, an imaging device, wherein the housing further includes an aperture to receive the second portion, wherein the second portion includes a sample tray including the target area, and wherein the second portion is movable relative to the aperture to provide access to the sample tray when moved away from the aperture.

In some aspects, the techniques described herein relate to a photometric imaging system including: a first lamp including: a plurality of light sources including a color temperature having an approximately constant value as a brightness of the plurality of light sources is changed; an edge-blending film to condition light emitted at an outer perimeter of the first lamp to soften a light edge; and a first light-shaping diffuser including a first diffusing angle to diffuse light emitted from an interior region of the first lamp to illuminate a sample approximately uniformly; an imaging device to capture images of the sample illuminated by the first lamp; and a target area to receive the sample.

In some aspects, the techniques described herein relate to a photometric imaging system, further including a controller to adjust a brightness of the first lamp through adjusting a drive current.

In some aspects, the techniques described herein relate to a photometric imaging system, further including a controller to adjust a brightness of the first lamp based on a first light setting, wherein the first light setting corresponds to at least one of a brightness level and an orientation of the light to be emitted.

In some aspects, the techniques described herein relate to a photometric imaging system, wherein the imaging device is parallel to an imaging axis perpendicular to the target area and placed a first distance away from the target area, wherein the first distance is approximately between 10 cm and 1000 cm, and wherein the first lamp includes a center that is a second distance away from an edge of the sample in the target area, wherein the second distance is approximately between 0 cm and 100 cm.

In some aspects, the techniques described herein relate to a photometric imaging system, further including a controller to instruct the imaging device to capture a first image of the sample with a first light setting and a second image of the sample with a second light setting, wherein at least the first light setting is provided by the first lamp, and wherein the first light setting corresponds to at least one of an orientation and a brightness of the first lamp emitting light towards the sample.

In some aspects, the techniques described herein relate to a photometric imaging system, further comprising a controller including a processor, wherein the controller allows for operation of the first lamp, and the imaging device to acquire image data of the sample, the controller to receive the image data and send the image data to the processor, the processor to obtain a plurality of properties of the sample to incorporate into a physically based rendering process.

In some aspects, the techniques described herein relate to a photometric imaging system, wherein the plurality of light sources includes a plurality of light emitting diodes having an approximately constant color temperature, wherein the approximately constant color temperature is in a range of 4,500 K to 10,000 K, and wherein the plurality of light emitting diodes includes a color rendering index having a value in a range between approximately 85% and 100%.

In some aspects, the techniques described herein relate to a photometric imaging system, wherein the target area is a removable target area relative to the imaging device.

In some aspects, the techniques described herein relate to a near-light apparatus, including: a first lamp including: a plurality of light sources; an edge-blending film to condition light emitted at an outer perimeter of the first lamp to soften a light edge; and a first light-shaping diffuser including a first diffusing angle to diffuse light emitted from an interior region of the first lamp to illuminate a sample approximately uniformly; a target area to receive a sample; and a housing including an inner volume, wherein the first lamp is arranged within the inner volume and faces the target area.

In some aspects, the techniques described herein relate to a near-light apparatus, further including a second lamp including a second plurality of light sources, a second edge-blending film, and a second light-shaping diffuser to illuminate the sample approximately uniformly.

In some aspects, the techniques described herein relate to a near-light apparatus, further including an imaging device to capture images of the sample illuminated by at least the first lamp and the second lamp, wherein the imaging device is parallel to an imaging axis perpendicular to the target area and placed a first distance away from the target area, wherein the first distance is approximately between 10 cm and 1000 cm, and wherein the first lamp includes a center that is fixed in position in the inner volume a second distance away from an edge of the sample in the target area, wherein the second distance is approximately between 0 cm and 100 cm.

In some aspects, the techniques described herein relate to a near-light apparatus, further including a controller to instruct the imaging device to capture a first image of the sample with a first light setting and a second image of the sample with a second light setting, wherein at least the first light setting is provided by the first lamp.

In some aspects, the techniques described herein relate to a near-light apparatus, wherein the plurality of light sources includes a plurality of light emitting diodes having an approximately constant color temperature, wherein the approximately constant color temperature is in a range of 4,500 K to 10,000 K.

In some aspects, the techniques described herein relate to a near-light apparatus, wherein the housing includes a first portion movably coupled to a second portion, wherein the first portion includes the first lamp, an imaging device, wherein the housing further includes an aperture to receive the second portion, wherein the second portion includes a sample tray including the target area, and wherein the second portion is movable relative to the aperture to provide access to the sample tray when moved away from the aperture.

In some aspects, the techniques described herein relate to a photometric imaging method including: calibrating a linear polarizer with respect to a first lamp including a plurality of first light emitting diodes, wherein the plurality of first light emitting diodes include a color temperature having an approximately constant value as a brightness of the plurality of first light emitting diodes is changed; rotating the linear polarizer to a first angle to transmit a first light from the plurality of first light emitting diodes to a sample; propagating the first light through a first edge-blending film to soften a brightness edge of the first light; reducing a presence of hotspots in a target area by propagating the first light through a first light-shaping diffuser and a second light-shaping diffuser to obtain a first conditioned light; propagating the first conditioned light through a first linear polarizer film to polarize the first conditioned light prior to illuminating the sample; and capturing a first image of the sample illuminated with the first conditioned light, wherein the first image includes surface normal information of the sample.

In some aspects, the techniques described herein relate to a photometric imaging method, wherein calibrating the linear polarizer with respect to the first lamp includes measuring an intensity of the first light as a function of a rotation angle of the linear polarizer, analyzing the intensity measured against an anticipated intensity value for the rotation angle of the linear polarizer, and adjusting the first angle to rotate the linear polarizer relative to the first lamp.

In some aspects, the techniques described herein relate to a photometric imaging method, further including: calibrating the linear polarizer with respect to a second lamp including a plurality of second light emitting diodes; rotating the linear polarizer to a second angle to transmit a second light from the plurality of second light emitting diodes to the sample; and capturing a second image of the sample illuminated with the second light.

In some aspects, the techniques described herein relate to a photometric imaging method, further including adjusting a current provided to at least the first lamp or the second lamp, wherein adjusting the current facilitates controlling a brightness of at least the first lamp or the second lamp.

In some aspects, the techniques described herein relate to a photometric imaging method, further including illuminating the first lamp and the second lamp in a user-defined order.

In some aspects, the techniques described herein relate to a photometric imaging method including: emitting a first light from a plurality of first light emitting diodes of a first lamp to a sample on a target area, wherein the plurality of first light emitting diodes include a color temperature having an approximately constant value as a brightness of the plurality of first light emitting diodes is changed; propagating the first light through a first edge-blending film to soften a brightness edge of the first light; reducing a presence of hotspots in a target area by propagating the first light through a first light-shaping diffuser and a second light-shaping diffuser to obtain a first conditioned light; propagating the first conditioned light through a first linear polarizer film to polarize the first conditioned light prior to illuminating the sample; rotating a linear polarizer to a first angle to capture a first image of the sample illuminated with the first conditioned light; and capturing the first image, wherein the first image includes surface normal information of the sample.

In some aspects, the techniques described herein relate to a photometric imaging method, further including rotating the linear polarizer to a second angle to capture a second image of the sample illuminated with the first conditioned light.

In some aspects, the techniques described herein relate to a photometric imaging method, further including: rotating the linear polarizer to a second angle to transmit a second light from a second lamp including a plurality of second light emitting diodes to the sample; and capturing a second image of the sample illuminated with the second light.

In some aspects, the techniques described herein relate to a photometric imaging method, further including adjusting a current provided to at least the first lamp or the second lamp, wherein adjusting the current facilitates controlling a brightness of at least the first lamp or the second lamp.

In some aspects, the techniques described herein relate to a photometric imaging method, further including illuminating the first lamp and the second lamp in a user-defined order.

BRIEF DESCRIPTION OF THE DRAWINGS

Throughout the drawings, reference numbers are re-used to indicate correspondence between referenced elements. The drawings are provided to illustrate examples of the subject matter described herein and not to limit the scope thereof.

FIG. 8 illustrates a photometric imaging method in accordance with some examples of the present disclosure.

DETAILED DESCRIPTION

A photometric imaging device, such as a photometric stereo imaging device, may include a light source for illuminating a sample and an imaging device (e.g., a camera) to acquire or capture images of the illuminated sample under different lighting conditions. The illuminated sample may reflect the light, and the reflected light can be used to extract certain information pertaining to the reflective properties of the sample material, including the directionality and the nature (e.g., diffuse, specular) of the reflections. The reflectance information can be used to obtain the digital three-dimensional (3D) surface topography and/or the 3D surface light reflectance characteristics of the sample.

The light source (or lamp) used in the photometric imaging device may be placed proximate to the sample to be illuminated and imaged (e.g., the light source may be located a distance in a range of approximately 0 cm to 100 cm relative to the edge of a sample being viewed), which allows for the formation of a compact imaging apparatus. However, implementing the light source in such a compact imaging apparatus can result in non-uniform lighting and hotspots, which can yield noisy image data. Further, attempts to evenly distribute or homogenize this light and/or remove hotspots can come at the cost of reducing the brightness of the illumination area incident on a material to be imaged, which can impact the quality of the resulting image data to be used in subsequent reconstructions of the material's surface.

The process to acquire or capture images of the illuminated sample under different lighting conditions can also be impacted by the lighting conditions. In particular, photometric stereo is a technique in which shadow placement is used to obtain the digital three-dimensional (3D) surface topography and/or the 3D surface light reflectance characteristics of the sample. Therefore, to obtain accurate image data to be used in subsequent reconstructions of the material's surface, the light emitted by the light source (or lamp) in a photometric imaging process may have a certain set of characteristics (e.g., color temperature, brightness level, color rendering index, etc.).

A near-light light source may be a single movable lamp that can be moved with respect to a sample, or the light source may include multiple lamps that are fixed at various angles relative to the sample. In some examples, multiple lamps may be arranged around a target area. The lamps can include optical stacks having multiple layers of optical elements, including arrays of light emitting diodes (LEDs), and at least some optical elements to be used to condition the light outputted from the LEDs for near-light illumination of a sample.

Example Near-Light Illuminator

Figure 1B:
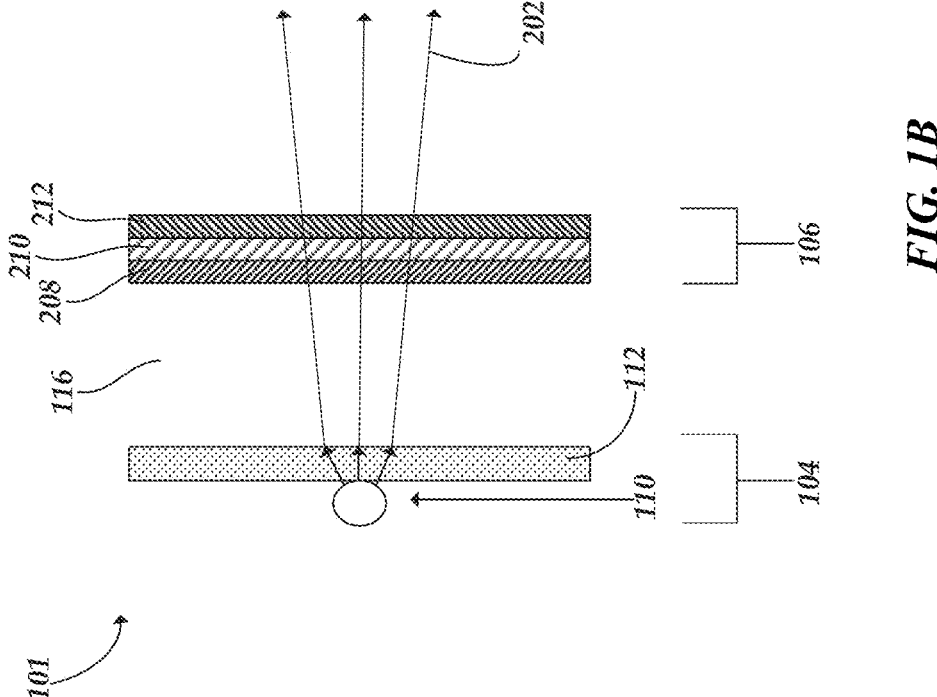
FIG. 1B illustrates a schematic side view of an optical stack of a lamp in accordance with some examples of the present disclosure.
Figure 1A:
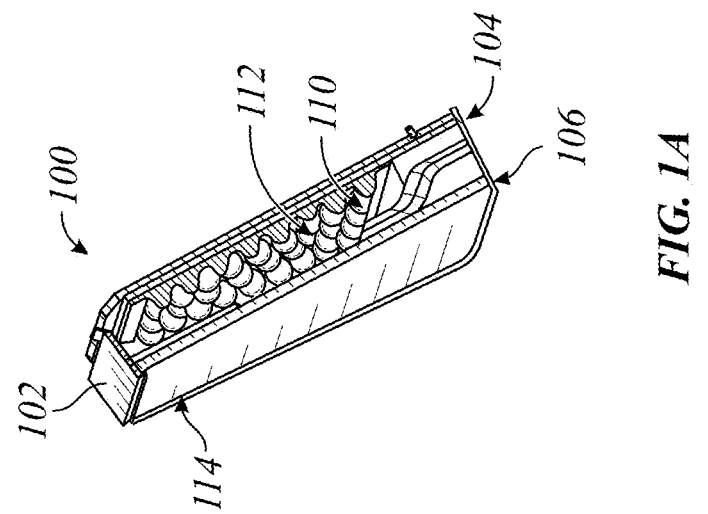
FIG. 1A illustrates a schematic cross-sectional perspective view of a lamp in accordance with some examples of the present disclosure.

Various examples disclosed herein relate to a near-light light source (e.g., illuminator or near-light illuminator) that can be used in a near-light system or device (e.g., near-light apparatus, or photometric imaging system), or an imaging method. FIGS. 1A-1B illustrate different views of a lamp 100 in a light box 102 (e.g., casing or frame) that can be used in an imaging device (e.g., near-light photometric imaging apparatus or imaging apparatus). In FIG. 1A, a perspective cross-sectional view of a lamp 100 that can be used in a near-light imaging device (e.g., near-light imaging apparatus 500 in FIG. 5A) or in a near-light device (e.g., near-light apparatus 600 in FIGS. 6A to 6C) is shown. In some examples, the lamp 100 (e.g., a light emitting diode (LED) light-box panel) can include multiple layers (e.g., first layer 104, second layer 106) having multiple functions. As shown in FIGS. 1A and 1B, in some examples, the lamp 100 can include an optical stack 101 having a first layer 104 that can function to provide a light source (e.g., a plurality of light sources or a plurality of LEDs 110) and lensing (e.g., optical lenses 112) for a uniform distribution of light on a sample (not shown), and a second layer 106 to condition a specular profile of the light 202 to be generated and outputted by the lamp 100.

In some examples, the light source may be selected for various capabilities. For example, light sources may be selected for their ability to provide a relatively constant color temperature across a wide range of brightnesses. Having a relatively constant color temperature at different brightness levels can help improve the quality of imaging data. For example, the color interpretation may be more consistent and accurate, thereby reducing variability in imaging results and enhancing the imaging process. These light sources may include LEDs; halogen lamps; tungsten filament lamps; fluorescent lamps; plasma lighting; and high-quality red, green, and blue (RGB) LED systems. In other cases, light sources may be selected for their ability to provide a constant color temperature and for having a color rendering index (CRI) value greater than 90. These light sources may include high-quality LEDs; halogen lamps; tungsten filament lamps; high-quality fluorescent lamps; and high-quality RGB LED systems.

The first layer 104 of the optical stack 101 may include a plurality of LEDs 110 and optical lenses 112. The plurality of LEDs 110 can be selected to possess the ability to output a bright white light having an approximately constant color temperature as a function of brightness. The color temperature may refer to a correlated color temperature (CCT) and may satisfy one or more standards set by one or more standard setting organizations (e.g., American National Standards (ANS) from the American National Standards Institute (ANSI)). The plurality of LEDs 110 can include a multi-layer phosphor blend. In some examples, the plurality of LEDs 110 can output a white light. For example, the light can have a color temperature of approximately 6,500 K. In other examples, the light can have a color temperature in a range of approximately 4,500 K to 10,000 K, in a range of approximately 4,500 K and 7,000 K, or in a range of 6,000 K and 7,000 K. The plurality of LEDs 110 can maintain an approximately constant color temperature. Layering and combinations of phosphors in the LEDs provide for uniform color temperature over a range of LED drive currents such as those developed by BridgeLux, Inc. of Fremont, California. Thus, as a brightness of the plurality of LEDs 110 is adjusted through adjusting the amount of current (e.g., drive current) provided to the plurality of LEDs 110, the color temperature will not fluctuate substantially (e.g., the color temperature may fluctuate +/−100 K and still be considered a constant color temperature). The plurality of LEDs 110 can have a color rendering index (CRI) value of approximately 90%. A CRI value of approximately 90% indicates that the plurality of LEDs 110 is able to render accurately approximately 90% of the visible light spectrum relative to natural sunlight. In some examples, the plurality of LEDs 110 can have a CRI value in a range between approximately 80% and 100%, or between approximately 85% and 100%. In some cases, an individual LED of the plurality of LEDs 110 can operate at a power value between approximately 0.5 W and 1.0 W, or between approximately 0.1 W and 10 W. The individual LED of the plurality of LEDs 110 may have at least 2 levels of brightness control. In some cases, at least 256 levels of brightness control are implemented.

In some examples, the plurality of LEDs 110 can include approximately 65 LEDs having a total wattage of approximately 50 W and yielding an average illuminance of approximately 3000 lux. In some examples, the plurality of LEDs 110 can include a number of LEDs in a range between approximately 5 LEDs or greater (e.g., between 5 LEDs and 200 LEDs), and the wattage of an individual LED can be in a range of approximately 0.1 W and 10 W.

Optical lenses 112 can be disposed over the plurality of LEDs 110 in the first layer 104. The optical lenses 112 may aid in providing a uniform light distribution. For example, the optical lenses 112 may generate an altered light distribution of an initial light distribution output by the plurality of LEDs 110. In some cases, the optical lenses 112 may comprise a structure to allow for a batwing light distribution (e.g., the shape of the light spread across an area may resemble the shape of batwings) of the light to be outputted by the plurality of LEDs 110. A batwing light distribution may focus the light from an LED away from a centerline, making possible a wider, more uniform light distribution. The light may be emitted at angles away from the center line at angles between 30° and 60°. In some examples, the optical lenses 112 are batwing lenses, which can create the batwing distribution of light. In some examples, the optical lenses 112 can include other lens types, allowing for a symmetric wide-angle (e.g., 140°) divergence of light. Other optical lensing or diffractive diffusing elements can be axially asymmetric and variable over the array of lensing or diffractive diffusing elements. Combinations of both collimating and diffusing lensing elements both serially or across the array may be used.

In the second layer 106 of the optical stack 101, light at an edge 114 (an outer perimeter) of the lamp 100 can be softened such that sharp transitions of light against a background are mitigated as the transition between light and dark is made gradual using an edge-blending film 208 (as described herein). The second layer 106 additionally facilitates the removal of hotspots through at least one diffusive element. Such diffusive elements may include a first light-shaping diffuser as described in more detail in FIGS. 2A and 2B.

Figure 2B:
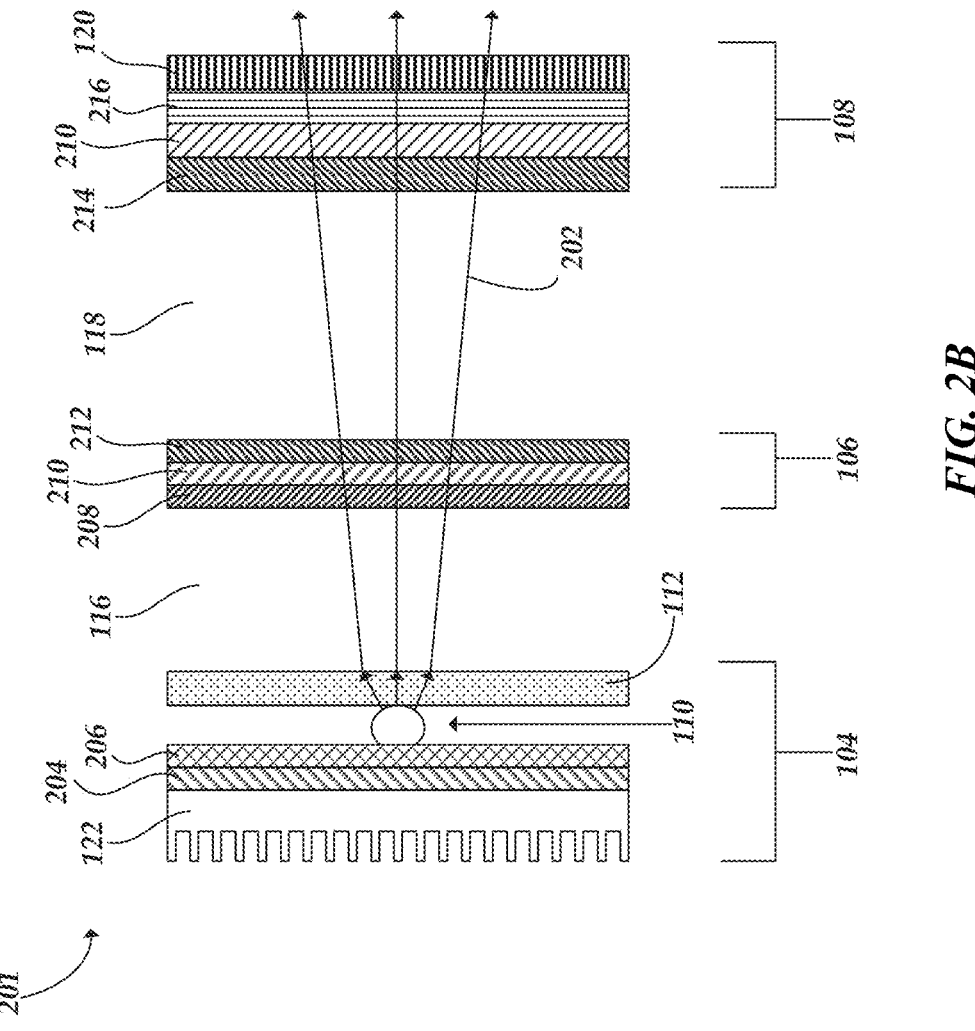
FIG. 2B illustrates a schematic side view of an optical stack of a lamp in accordance with some examples of the present disclosure.
Figure 2A:
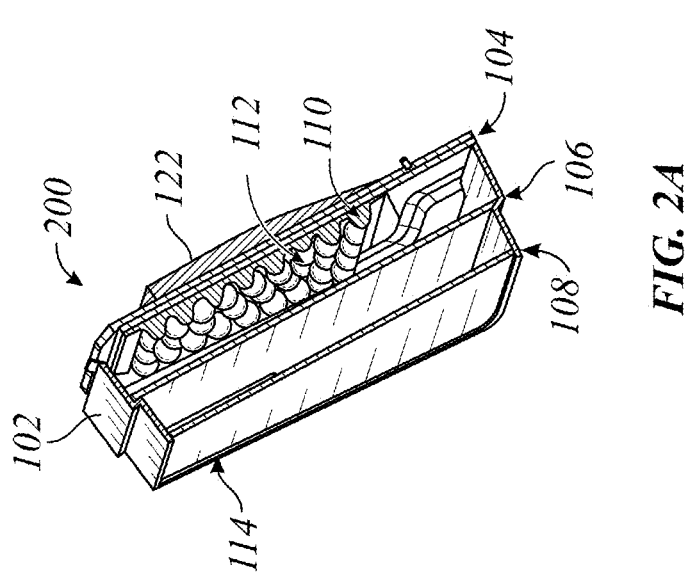
FIG. 2A illustrates a schematic cross-sectional perspective view of a lamp in accordance with some examples of the present disclosure.

FIGS. 2A and 2B illustrate a lamp 200 having an optical stack 201, in which light is generated and transmitted through the optical stack 201 according to some examples. The lamp 200 in FIGS. 2A and 2B can be used in a near-light imaging device (e.g., near-light imaging apparatus 500 in FIG. 5A) or in a near-light device (e.g., near-light apparatus 600 in FIGS. 6A to 6C). FIG. 2A illustrates a lamp 200 having three layers (first layer 104, second layer 106, and third layer 108). FIG. 2B illustrates in more detail the optical stack 201 of the lamp 100 in FIG. 2A. First layer 104 includes a light source (e.g., plurality of LEDs 110) to generate light 202 to illuminate a sample. Light 202 from the plurality of LEDs 110 may be transmitted through the optical lenses 112 or a planar diffractive element, which can distribute the light 202 over an entire plane of view of a camera. In some examples, optical lenses 112 facilitate distributing the light evenly over a surface area (e.g., provides even illumination of a sample).

A heat sink 122 may be provided at the back of the first layer 104 to transfer the heat generated by the elements of the lamp 100 to a fluid medium (e.g., air), thereby facilitating cooling. The heat sink 122 can be an aluminum fin-bladed heat sink. In some cases, the heat sink 122 can be made from a metal suitable for thermal dissipation. In some examples, the plurality of LEDs 110 is electrically connected to a printed circuit board (PCB 204). The PCB 204 facilitates controlling a brightness of the plurality of LEDs 110. In some examples, the PCB 204 is an aluminum clad PCB. In some examples, the first layer 104 can include a reflective film 206 to aid in directing light emitted from the plurality of LEDs 110 in a direction away from the PCB 204, which can help improve the brightness of the light 202 that is outputted. The reflective film 206 can be a white reflective sheet. In some examples, the reflective film 206 is a poly-olefin-based white reflective sheet. In some cases, the heat sink 122 is in contact with (e.g., directly coupled to) the optical stack 201. In some cases, the PCB 204 may be included in alternative locations relative to the optical stack 201. For example, PCB 204 may not be included between the heat sink 122 and the reflective film 206. In cases where the PCB 204 is not between the heat sink 122 and the reflective film 206, the heat sink 122 may be directly coupled to the reflective film 206.

After the light is transmitted through the optical lenses 112, the light may be propagated through a first air gap 116 and is incident on the second layer 106. The first air gap 116 may have a thickness of approximately 8 mm. In some cases, the first air gap 116 may have a value in a range between approximately 5 mm and 20 mm. The light may be transmitted through an edge-blending film 208. In the absence of an edge-blending film 208, light produced from the lamp 200, which is enclosed in a light box 102, may produce a sharp brightness edge, or a relatively sharp transition between the light against a background. The edge-blending film 208 facilitates conditioning, blending, or softening this sharp brightness edge relative to the background. In some examples, the edge-blending film 208 is a spatial dot-pattern filter in which the dots can be black dots or white dots. In some examples, the edge-blending film 208 is a gradated photographic film or gradient transmissive neutral density film. The light transmitted through the edge-blending film 208 can be transmitted through an optically clear sheet 210, such as an optically clear polycarbonate sheet, and then transmitted through a first light-shaping diffuser 212.

In near-light illumination, each LED can yield a hotspot. The light 202 can be transmitted through a first light-shaping diffuser 212 and a second light-shaping diffuser 214 to facilitate removal of the hotspots and facilitate illumination of a sample approximately uniformly. In some examples, the first light-shaping diffuser 212 can provide a first pass of diffusing the light 202. In some examples, the first light-shaping diffuser 212 is an engineered element having an angle of approximately 5° at full-width half-maximum (FWHM). For example, the first light-shaping diffuser 212 can be a film having a surface engineered and embossed to include a holographic diffraction pattern. Depending on the holographic diffraction pattern, asymmetric divergence in independent axes may be obtained and may include elliptical, batwing, and Gaussian distributions. In some examples, the first light-shaping diffuser 212 can have an angle in a range of approximately 3°-25°) at FWHM. The light 202 transmitted through the first light-shaping diffuser 212 is transmitted through a second air gap 118 and is incident on the third layer 108. The first light-shaping diffuser 212 may have a patterned or textured surface that faces the first air gap 116. The second air gap 118 may have a thickness of approximately 20 mm. In some cases, the second air gap 118 may have a value in a range between approximately 15 mm and 100 mm.

The third layer 108 can facilitate further specular profile conditioning to remove any hotspots that may exist because of the light source's proximity to a sample. This layer also facilitates homogenization or uniformity of the projected light profile onto the view surface by the camera. Layer 108 can be the last layer the light propagates through prior to illuminating the sample. The third layer 108 can additionally function to linearly polarize the light via inclusion of a color neutral linear polarizing film and to reduce possible reflections of light over a large range of incident angles from other lamp sources which create photometric stereo light noise via for example MOSMITE™ anti-reflective film from Mitsubishi Chemical of Tokyo, Japan inclusion. Air gaps (first air gap 116, second air gap 118) separate the first layer 104 from the second layer 106 and the second layer 106 from the third layer 108.

In the third layer 108, the light 202 passes through a second light-shaping diffuser 214 disposed after the first light-shaping diffuser (e.g., the light 202 transmitted through the second light-shaping diffuser 214 is the light that has been initially diffused by the first light-shaping diffuser 212), where it is blended or homogenized to remove or reduce hotspots in an interior region of illumination. As described with the first light-shaping diffuser 212, the second light-shaping diffuser 214 can also include an engineered textured surface (e.g., have a holographic diffraction pattern) facing the second air gap 118 in the optical stack 201. In some examples, the second light-shaping diffuser 214 has an angle greater than the angle of the first light-shaping diffuser 212. In some examples, the second light-shaping diffuser 214 has an angle of approximately 20° at FWHM. In some cases, the second light-shaping diffuser 214 can have an angle in a range of approximately 10°-50° at FWHM.

The light 202, which has undergone specular reflection conditioning, can be transmitted through another optically clear sheet 210, and then transmitted through a color neutral polarizer (e.g., color neutral linear polarizing film). In some cases, the optically clear sheet 210 is an optional element. For those cases where the optically clear sheet 210 is optional, an additional air gap can instead be implemented in place of the optically clear sheet 210. In some examples, the color neutral polarizer is a linear polarizer film 216 fixed (e.g., adhered using an optically clear adhesive) to the optically clear sheet 210. In some examples, the linear polarizer film 216 has a vertically oriented transmission axis or an approximately vertically oriented transmission axis. This orientation should be consistent with all other lamps being used together to provide photometric stereo image data. The linearly polarized light can be transmitted through an anti-reflective film 120 disposed on the front surface of the lamp 200. The anti-reflective film 120 can comprise a layer having a moth-eye structure, which can create a gradient of the index of refraction, such that as the light is transmitted through the anti-reflective film 120, changes from one index of refraction to another are reduced, which aids in reducing light reflections. In some cases, the anti-reflective film 120 is a MOSMITE™ film, and this film may be oriented such that it has a fast axis aligned parallel to a vertically oriented transmission axis of the linear polarizer film 216. In some examples where the lamp 200 is one of multiple lamps (e.g., eight lamps) that are adjacent to one another, the anti-reflective film 120 residing on the front surface of the lamp 200 can reduce the amount of reflection from nearby lamps, which may be noise reflection.

In some cases, the optical stack 201 of the lamp 200 may include alternative configurations, different from what is illustrated in FIG. 2B. For example, the gaps in between some of the layers may be omitted. In other examples, the linear polarizer film 216 may be incorporated earlier on in the optical stack 201 (e.g., nearer to the light LEDs 110 and further away from the anti-reflective film 120).

Figure 3A:
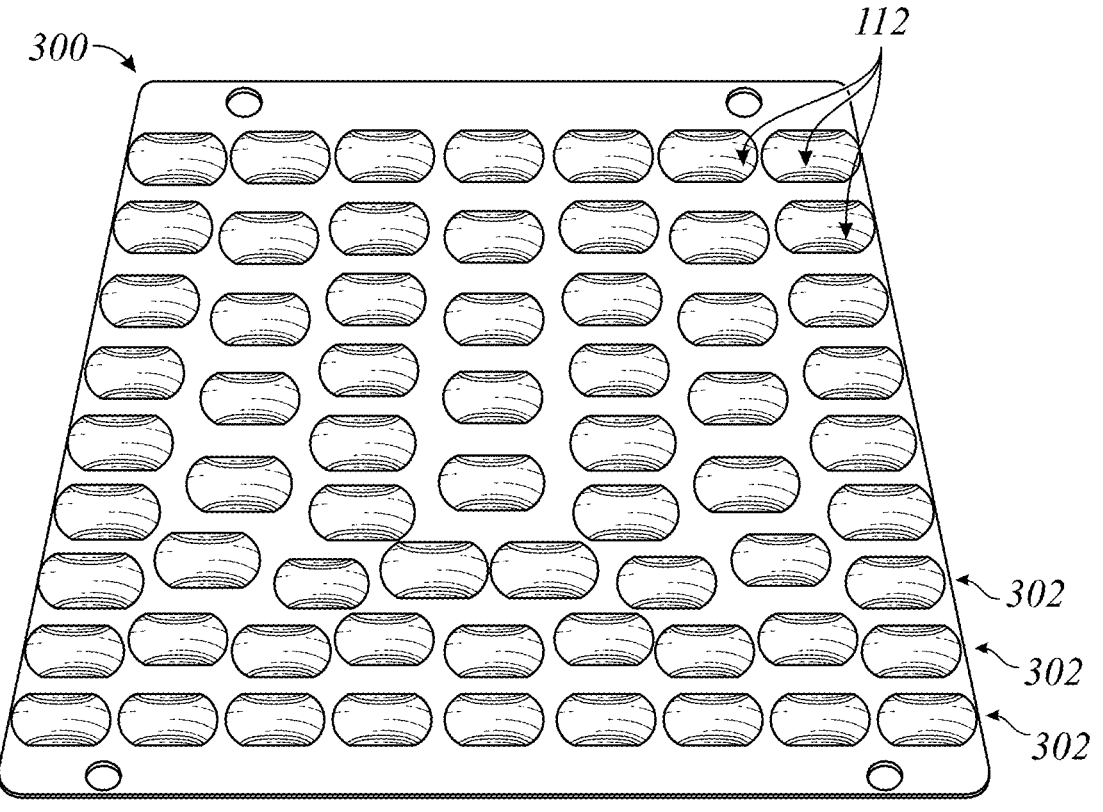
FIG. 3A illustrates a schematic top view of a light source having a staggered configuration and a lens array in accordance with some examples of the present disclosure.

FIG. 3A schematically illustrates one example of an optical lens array 300 including the optical lenses 112. The optical lenses 112 can be arranged or distributed in multiple rows 302 that are staggered with respect to one another. Staggering the multiple rows 302 can aid in blending the light to create a smooth light distribution. In some cases, the optical lenses 112 can be distributed in a pattern having irregular spacing of rows with respect to one another. As shown in FIG. 3A, the optical lenses 112 are individual lenses that overlie an individual LED of the plurality of LEDs 110. In some examples, a fewer number of optical lenses comprising larger footprints than the optical lenses 112 pictured, can be used over multiple LEDs.

Figure 3B:
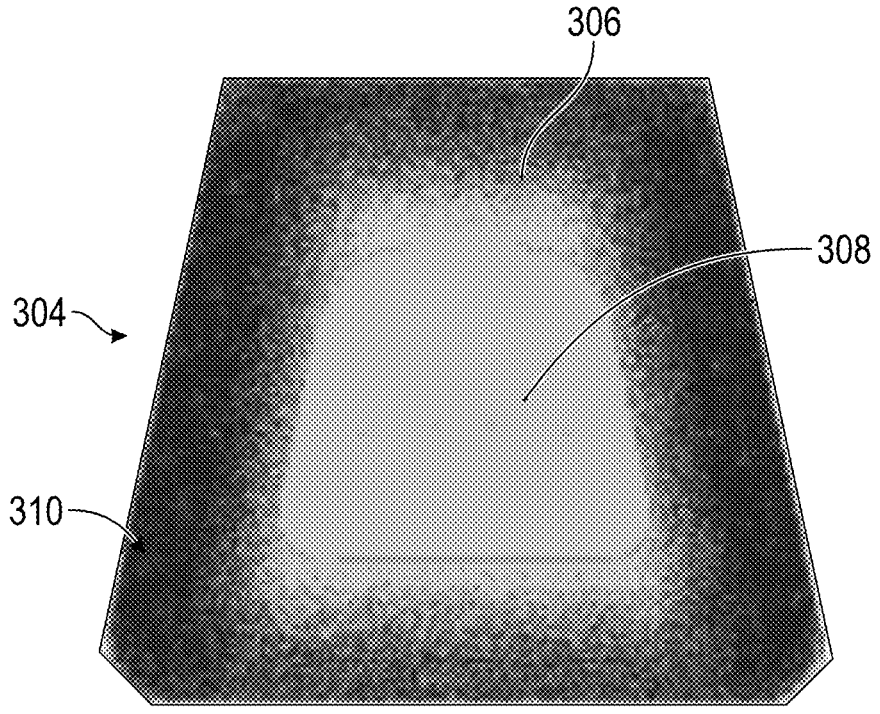
FIG. 3B illustrates a schematic top view of an edge-blending film in accordance with some examples of the present disclosure.

FIG. 3B illustrates a schematic spatial dot-pattern filter 304 that can be implemented as the edge-blending film 208. The spatial dot-pattern filter 304 can be an opaque dot pattern having black dots 306 or white dots that are patterned on the spatial dot-pattern filter 304 to have a variable density. For example, as shown in FIG. 3B, black dots 306 transition from being sparse in density nearer a center 308 of the spatial dot-pattern filter 304 to being increasingly denser at the edges or perimeter 310 of the spatial dot-pattern filter 304. White dots in this pattern can also reflectively diffuse the edge. The spatial dot-pattern filter 304 can feather or soften the edges of the light to remove straight lines of light or smooth the brightness edges of the light being generated by the lamp 100 or lamp 200. In some cases, instead of a spatial dot-pattern filter 304, a gradated photographic film can be implemented as the edge-blending film 208.

Figure 4:
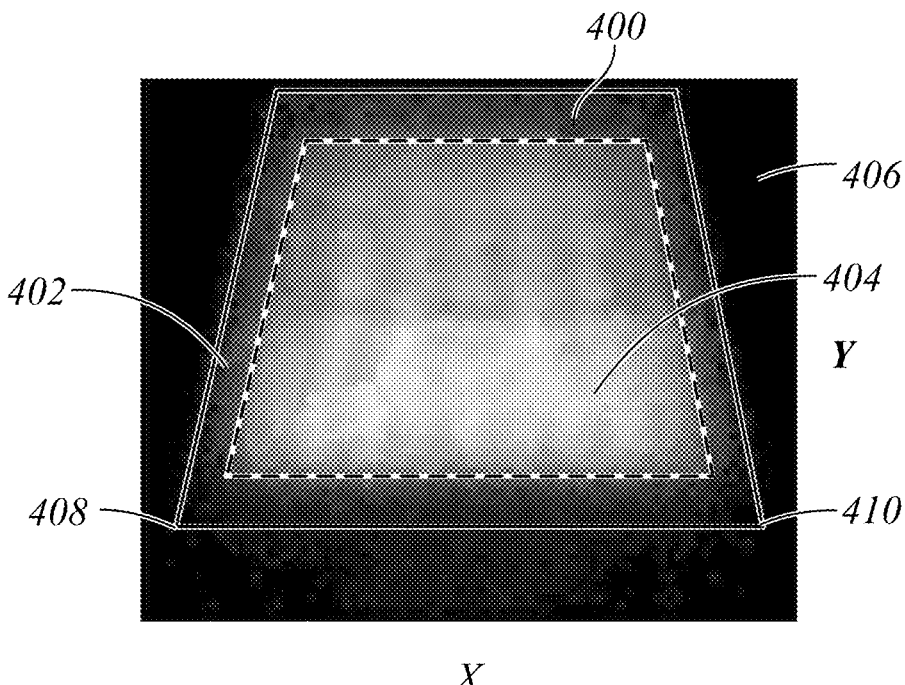
FIG. 4 illustrates a schematic top view of a simulated illuminated lamp transmitting light with softened edges and devoid of hotspots in accordance with some examples of the present disclosure.

As discussed herein, in some cases, transmitting light from the lamp 200 through multiple optical layers including the first light-shaping diffuser 212, and the second light-shaping diffuser 214 allows for the reduction of hotspots from light emitted from an interior region of the lamp 200, which can occur when using the plurality of LEDs 110 for near-light illumination of a sample. Further, because the lamp 200 may be in a light box 102, light outputted from the light box 102 can illuminate a target area against a background (e.g., a dark background) and in the absence of an element to mitigate the transition between the illuminated target area and the background, a sharp brightness edge can occur, hindering near-light photometric imaging and analysis. In some examples, the lamp 200 can include the edge-blending film 208 to soften a brightness edge of the light illuminating a target area. FIG. 4 shows a specular reflection simulation for a lamp 200.

In FIG. 4, a simulated graphic illustrates the light output of a simulated lamp 400. The result is a grayscale image lacking a presence of hotspots and having a blurred or softened brightness edge (e.g., gradient area 402) between the light region (e.g., uniformity area 404) and the dark background 406. The uniformity area 404 can have a uniformity value in a range of between approximately 40% and 100%. In some cases, the uniformity value can be determined through averaging uniformity values determined for multiple regions within a light region (e.g., uniformity area 404). For each sampled area within the light region, the uniformity can be determined as the ratio of the minimum illuminance to the maximum illuminance and converted to a percentage value. In some cases, at least 100 equally sized regions are utilized to determine the average uniformity value. In other cases, more or fewer equally sized regions are utilized to determine the average uniformity value. The blurred or softened brightness edge can have a slope of illumination that is decreasing, smooth, and/or continuous. In some cases, the slope of illumination can be determined by analyzing the gradient area 402. For example, gradient area 402 may have a thickness defined by the outer solid and the dotted inner line illustrated in FIG. 4. A length of the gradient area to be analyzed may include the length between a point 408 and a point 410. Multiple equally sized regions may be sampled or analyzed along this length. For example, one such region may have a sample width value that is $\frac{1}{20}^{th}$ or $\frac{1}{4}^{th}$ of the length between point 408 and point 410. In some cases, at least 10 equally sized regions across this length may be sampled/analyzed. The average illuminance may be determined for each of the regions and a slope value may be determined based in part on the size of the regions and the average illuminance. In some cases, the slope value will be less than or equal to the average illuminance divided by the width of the region, which may then be divided by 1.5 lux per cm.

Example Near-Light Imaging Device

Figure 5A:
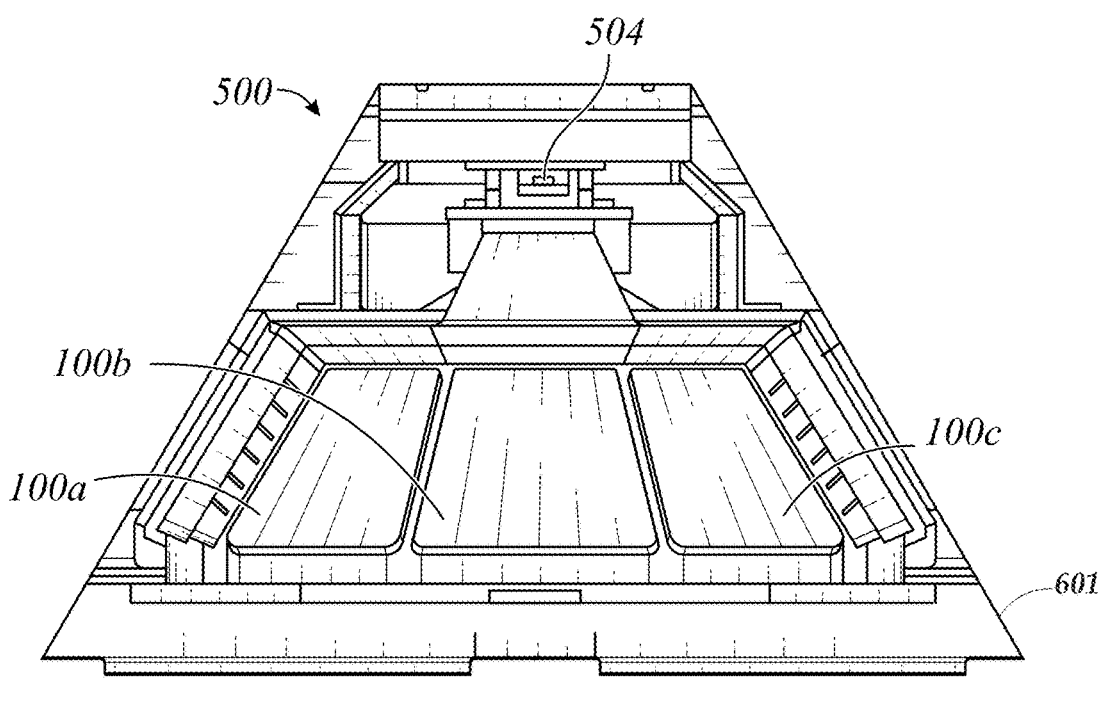
FIG. 5A illustrates a partial schematic top view of a photometric imaging apparatus with three lamps and a camera in accordance with some examples of the present disclosure.
Figure 5B:
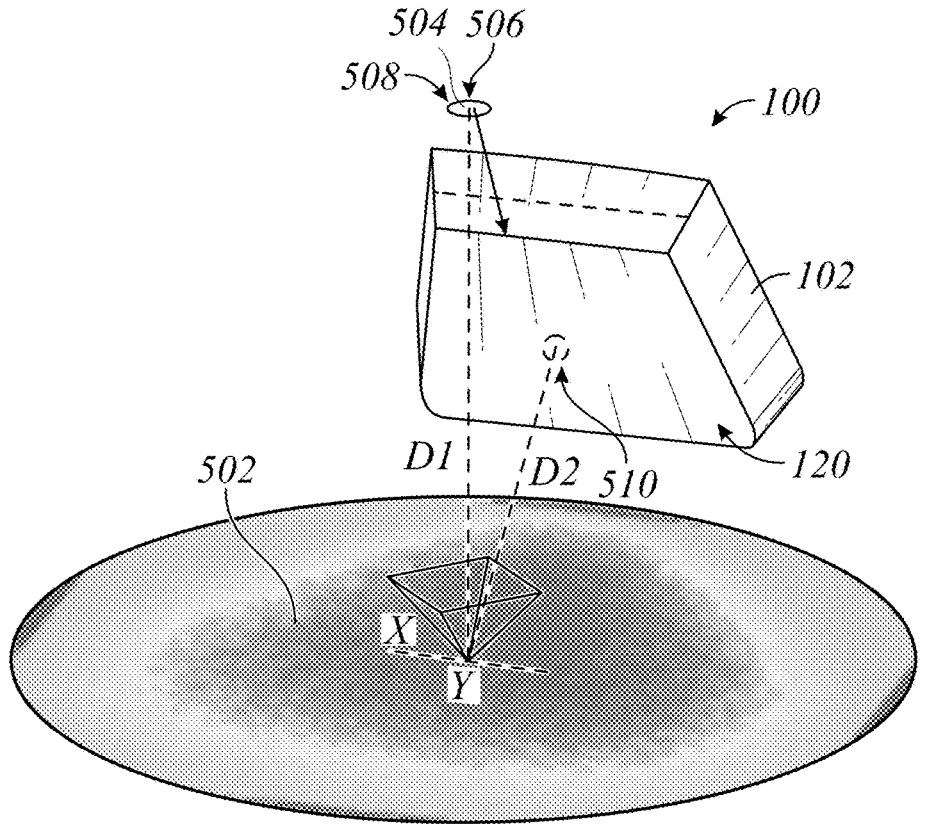
FIG. 5B illustrates a schematic perspective view of a lamp oriented at an angle relative to a target area in accordance with some examples of the present disclosure.

In some examples, and as shown in FIG. 5A, a near-light imaging apparatus 500 can include a lamp 100 or a lamp 200 (e.g., a first lamp). In some examples, the near-light imaging apparatus 500 can include at least one lamp which can have the structure of the lamp 100 or the lamp 200 previously described in reference to FIGS. 1A to 2B. In FIG. 5A, three lamps (100a, 100b, 100c) are illustrated in a cross-sectional perspective view of the interior of a near-light imaging apparatus 500. Although FIG. 5A illustrates lamps 100a, 100b, and 100c, which correspond to lamp 100, in some cases, the lamps can instead correspond to lamp 200. The individual lamps can be oriented at an angle relative to a target area 502 as shown in FIG. 5B. For example, a lamp 100 in the near-light imaging apparatus 500 can be positioned to have a grazing angle of approximately 30° with respect to the target area 502. In some cases, the lamp 100 can be positioned to have a grazing angle in a range of approximately 10°-70° with respect to the target area 502.

The individual lamp(s) can be fixed on an interior surface of the near-light imaging apparatus 500. In some examples, the near-light imaging apparatus 500 may include a single lamp (e.g., lamp 100 or lamp 200) that is a movable lamp that can be moved to different positions relative to the target area 502. In some other examples, the near-light imaging apparatus 500 may include between two and eight lamps, where an individual lamp is in a fixed position relative to the target area 502. In some cases, the near-light imaging apparatus 500 may include less than ten lamps, or less than twelve lamps. Implementing a greater number of lamps (e.g., eight) can help increase the amount of information collected pertaining to the surface of a sample, improving the quality of the imaging data collected.

Lamp 100 or lamp 200 may operate according to various light settings. As described herein, light setting refers to a set of parameters implemented by a lamp (e.g., lamp 100 and lamp 200) during an image acquisition process. The set of parameters includes at least one of a brightness level and an orientation of the light to be emitted towards the sample. In some examples, a single lamp can provide different light settings. In other examples, when having multiple lamps, different light settings may be implemented by each of the lamps.

The near-light imaging apparatus 500 can also include an imaging device 504 capable of capturing an image of a sample illuminated by a lamp 100 or lamp 200. The imaging device 504 can be a camera. For example, the camera can be a color complementary metal-oxide semiconductor (CMOS) imager. In some examples, the camera can include approximately between 40 MP and 200 MP. In some examples, the camera includes 108 MP. In some examples, the imaging device 504 can include additional features. For example, the imaging device 504 can include a 7-lens element for high fidelity images over a target area, an optical image stabilizer, and/or focusing capabilities that can include autofocusing capabilities or manual focusing capabilities. In some examples, the imaging device 504 can be a mobile phone camera module. In some cases, the near-light imaging apparatus 500 can include more than one imaging device 504. For example, the near-light imaging apparatus 500 can include two imaging devices 504 (e.g., two cameras) to allow for dual photometric stereo sampling and adding the capability of 3D stereo vision true depth measurement to the system. In some cases, the imaging device 504 may be removable. For example, the near-light imaging apparatus 500 can include an element (e.g., a mount, imaging device holder, etc.) or a receptacle to receive the imaging device 504, which can facilitate placement of the imaging device 504 along an imaging axis 506.

As shown in FIG. 5B, the imaging device 504 of the near-light imaging apparatus 500 can be placed parallel to an imaging axis 506 that is perpendicular to the target area 502. In particular, the imaging device 504 can be located at a position 508 relative to the lamps (e.g., lamp 100 or lamp 200) and the target area 502. The imaging device 504 can be located a first distance D1 away from the target area 502. D1 can be a distance in a range of approximately 10 cm-1000 cm. A lamp 100 having a center 510 (indicated by the dashed circle in the figure), can be positioned relative to the target area 502, such that the center 510 is a second distance D2 away from an edge of a sample on the target area 502. D2 can be a distance proximate to the edge of the sample being viewed in a range of approximately 0 cm-100 cm from the edge of the sample. Although FIGS. 5A-5B illustrate a lamp 100, a lamp 200 can be implemented instead. Further, although FIGS. 5A-5B illustrate a lamp 100 having an approximately trapezoidal shape, the lamp 100 can take on other shapes. For example, lamp 100 can be rectangular, triangular, or circular, among other shapes.

Figures 6A, 6B, 6C:
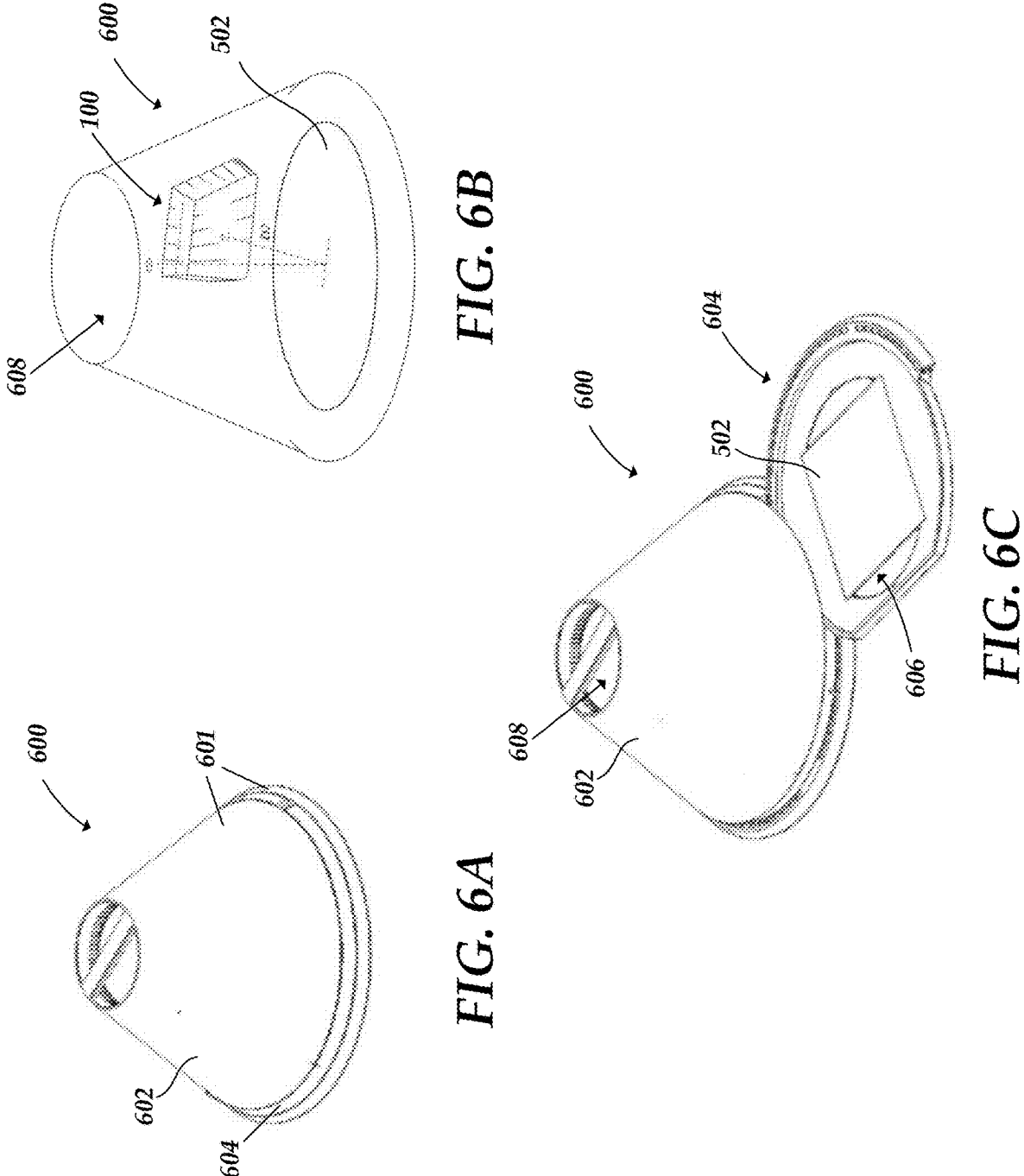
FIGS. 6A-6C illustrate a schematic perspective view of a photometric imaging apparatus in accordance with some examples of the present disclosure.

FIG. 6A illustrates a schematic view of a near-light apparatus 600. Some elements have been omitted from the schematic view to simplify the representation. The near-light apparatus 600 can include a housing 601 having two portions (e.g., a first portion 602 and a second portion 604). In some examples, a near-light imaging apparatus 500 includes the near-light apparatus 600 and an imaging device 504. In these examples, the imaging device 504 may be removable relative to the housing 601. In some examples, the imaging device 504 may be a fixed imaging device relative to the housing 601 (e.g., fixed within or on the housing 601. In some cases, where an imaging device 504 is included, the first portion 602 can be an upper portion of the housing 601 including an inner volume 608 in which the lamps 100 and the imaging device 504 can be positioned. In some examples, as shown in FIG. 6B, a lamp 100 can be fixed in position in the inner volume 608 of the first portion 602 of the housing 601, such that the center 510 is a distance D2 away from the target area 502. Although FIG. 6B illustrates an example using a lamp 100, any of the lamps previously explained in reference to FIGS. 1A to 2B can be used instead. The second portion 604 can be a lower portion of the housing 601 that couples to the first portion 602. The second portion 604 can include the target area 502 located within a sample tray 606 upon which a sample can be placed for imaging. In some cases, the sample tray 606 can be accessed by rotating it outward or away from the first portion 602. Although FIG. 6C shows the second portion 604 in an open configuration in which the second portion 604 remains attached to the first portion 602, in some cases, the second portion 604 can be completely separated and detached from the first portion 602. In some examples, the second portion 604 can be separated from the first portion 602 through a rotating mechanism, such that the second portion 604 can be rotated away from the first portion 602 to make the sample tray 606 accessible to a user. In some cases, the second portion 604 can be displaced with respect to the first portion 602 through a non-rotating or linear sliding mechanism. In some examples, the first portion 602 may comprise an aperture to receive a sample tray 606 that is removable or movable relative to the first portion 602. In some cases, inserting the sample tray 606 of the second portion 604 completely into the aperture may function to block or reduce ambient light (or background light) from entering the near-light apparatus. In some examples, the target area 502 is a removable target area relative to the imaging device 504.

The first portion 602 can include a rigid conical structure to house at least a first lamp (e.g., lamp 100 or lamp 200). The rigid conical structure can include an interior surface that is angled, such that when a lamp 100 is positioned on the interior surface, the lamp 100 may be positioned such that light emitted from the lamp will have a low grazing angle (e.g., approximately 30 degrees) relative to the target area 502. In some examples, where the near-light apparatus 600 includes eight lamps, the eight lamps can be arranged in an octagonal configuration that is approximately centered with respect to the imaging device 504.

In some examples, a photometric imaging system 700 (see FIG. 7) may correspond to an apparatus including the near-light imaging apparatus 500 and the near-light apparatus 600. The photometric imaging system 700 may include and use the lamps described in relation to FIGS. 1A and 1B (e.g., lamp 100, lamp 200). In some cases, a single lamp (e.g., lamp 100, lamp 200) may be used for illumination, and the single lamp can be moved to different positions relative to a target area 502. In some cases, multiple lamps (e.g., two or more lamps) may be used for illumination, and each of the lamps may be located at a different position relative to the target area 502. In some examples, the photometric imaging system 700 may include an imaging device 504 that is removable. In some examples, the photometric imaging system 700 may include an imaging device 504 that is fixed.

Example Photometric Imaging Process

Figure 7:
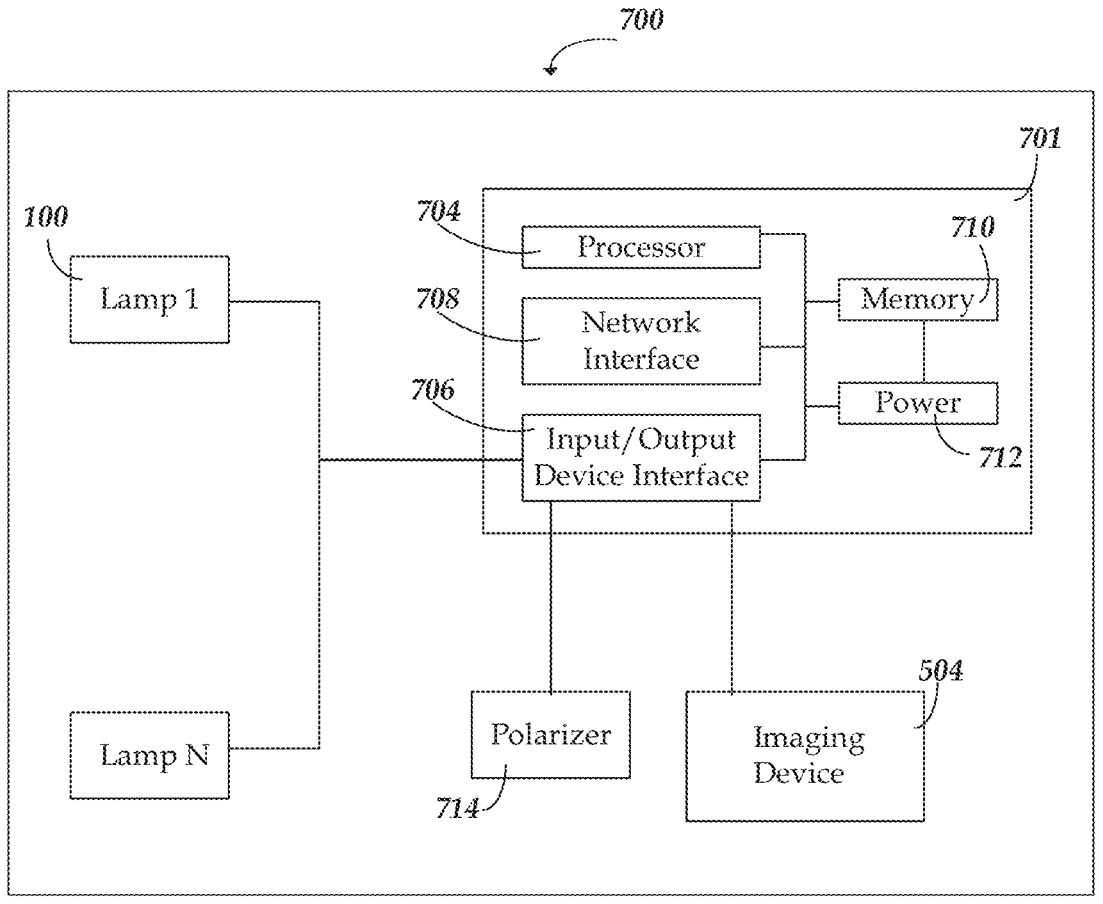
FIG. 7 illustrates a block diagram of at least some of the components of the photometric imaging apparatus in accordance with some examples of the present disclosure.

FIG. 7 illustrates a schematic block diagram depicting an illustrative general architecture of a photometric imaging system 700, which may include a near-light imaging apparatus 500 or a near-light apparatus 600. The photometric imaging system 700 can include more (or fewer) components than those shown in FIG. 7. The photometric imaging system 700 can include a plurality of lamps, where an individual lamp can have the same or similar components as in lamp 100 or lamp 200, a controller 701 (control or processing unit), an imaging device 504 (e.g., camera), and a polarizer 714. The controller 701 can include a processor 704 and an input/output device interface (e.g., I/O device interface 706). In some examples, the I/O device interface 706 can include a user interface (not shown) for operating or controlling the photometric imaging system 700 and/or data analysis. In some examples, the controller 701 can include a network interface 708. In some examples, the network interface 708 can allow for short-range wireless connections (e.g., Bluetooth® or Wi-Fi connection). The controller 701 components can communicate with one another by way of a communication bus. The controller 701 is associated with, or in communication with, at least one output device and at least one input device. For example, the output device can be the lamp 100 (e.g., Lamp 1-Lamp N, where N is greater than 1). The network and/or host computer interface 708 can provide the controller 701 with connectivity to one or more networks or computing systems. The processor 704 can thus receive information and instructions from other processing systems or services via a network (e.g., wireless personal area network (WPAN), local area network (LAN), etc.). The processor 704 can also communicate to and from the memory 710 and further provide output information (e.g., a plurality of images) for an output device (e.g., a display (not shown)) via the I/O device interface 706. The I/O device interface 706 can accept input from an input device (e.g., imaging data or information acquired from the camera 702). The memory 710 can contain computer program instructions that can be executed by the processor 704. In some examples, the memory 710 can include RAM, ROM, and/or other persistent or non-transitory computer-readable storage media. The controller 701 further includes a power source for providing power 712 to the controller 701.

In some examples, the controller 701 facilitates the operation of at least one of each of the lamps 100 and the imaging device 504, which can be removable or fixed. For example, the controller 701 can control a brightness of the lamp 100 by adjusting an amount of current to be delivered to each lamp 100 to power the plurality of LEDs 110 in each lamp 100. The controller 701 can additionally facilitate calibrating a lamp 100, in part, by sending signals to adjust a polarizer 714 (e.g., rotate a linear polarizer) along an optical pathway including the imaging device 504 relative to an individual lamp 100 having a linear polarizer film 216. Although FIG. 7 illustrates an example using a lamp 100, any of the lamps previously described in reference FIGS. 1A to 2B can be used instead. The controller 701 can also function to operate the imaging device 504 such that the imaging device 504 can capture multiple images of the sample as the sample is illuminated from different directions. For example, the controller 701 can instruct the imaging device 504 to capture an image or otherwise acquire image data of a sample. The controller 701 can receive the image data and send the image data to the processor 704, which can facilitate obtaining a plurality of properties of the sample. These properties include properties of the sample's material. For example, these properties may include surface roughness, color, surface normal information, and more. These properties can subsequently be used in physically based rendering (PBR) processes, which can help provide an accurate representation of how light interacts with various materials.

In some examples, the controller 701 can send signals to the imaging device 504 to enable autofocusing of the imaging device 504 relative to the target area 502. In some examples, the controller 701 can facilitate an ordered acquisition (e.g., a user-defined order for acquiring images of a sample illuminated by individual lamps at different positions relative to the sample) by the imaging device 504 to capture a first image of the sample illuminated by a first lamp (e.g., lamp 100) and a second image of the sample illuminated by a second lamp (e.g., lamp 100). In some examples, the controller 701 can instruct the imaging device 504 to capture a first image of a sample with a first light setting and a second image of the sample with a second light setting. The first and second light settings are the light parameters to be implemented for an image acquisition. The first light setting can include at least a brightness and an orientation of the light. In some cases, the first light setting can be provided by the first lamp and the second light setting can be provided by a second lamp. In some cases, the first and the second light settings can be provided by the first lamp. Although multiple lamps are illustrated, a single lamp could be used instead, and the single lamp could provide different light settings where a light setting is associated with a different orientation of the single lamp relative to the sample (e.g., a first light setting corresponds to a first orientation and a second light setting corresponds to a second orientation). In some cases, the controller can facilitate rotating the single lamp relative to the sample and enable the camera to acquire images of the sample as it is illuminated by the single lamp at different positions. In some cases, the controller can facilitate rotating the sample relative to the single lamp and enable the imaging device to acquire images of the sample as it is rotated. In some examples, the polarizer 714 may be disposed between the imaging device 504 and the sample. In some cases, the polarizer 714 may be a linear polarizer in which a polarization viewing state of the linear polarizer can be adjusted by rotating the linear polarizer. In some cases, the polarizer 714 may be an optical filter such as a liquid crystal tunable filter, where the polarization viewing state can be adjusted through varying a drive current provided to the liquid crystal tunable filter.

FIG. 8 illustrates an example photometric imaging process 800. FIG. 8 describes the imaging process for a first lamp (e.g., lamp 100 or lamp 200). In some cases, the process described in FIG. 8 can apply to processes implementing more than one lamp. As previously described, different light settings may be provided using one or more lamps. At block 802, the photometric imaging process 800 emits a first light from a plurality of first light emitting diodes (plurality of LEDs 110) of a first lamp (e.g., the lamp 100, as described herein). At block 804, light generated from the first LEDs is then propagated through a first edge-blending film (e.g., the edge-blending film 208) to soften a brightness edge. The light outputted from the first edge-blending film can then be propagated through a first light-shaping diffuser 212 and a second light-shaping diffuser 214 at block 806 to obtain a conditioned light (e.g., a first conditioned light). This conditioned light results in reducing the presence of hotspots in a target area 502 as the first light-shaping diffuser 212 can function to initially spread the light out, and the second light-shaping diffuser 214 can function to blend the light that has been spread out by the first light-shaping diffuser 212. At block 808, the conditioned light can then be propagated through a linear polarizer film 216 to linearly polarize the conditioned light. The conditioned light can be linearly polarized in a direction that is vertically oriented with respect to the transmission axis of the linear polarizer film 216. The linearly polarized and conditioned light is then transmitted to the target area 502 where a sample can be illuminated. At block 810, the photometric imaging process 800 can further include providing different polarizer viewing states. For example, the polarizer 714 can be adjusted to modify a polarization viewing state while the sample is illuminated with the first conditioned light from a first lamp (e.g., the lamp 100). The polarizer 714 can have its polarizer viewing state modified with respect to the first lamp to capture a first image of the sample illuminated with the conditioned light (e.g., the polarization direction of the polarizer 714 can be oriented at a polarization angle relative to the polarization direction of the linear polarizer film 216, where the angle can be in a range of approximately 0° (aligned)-90° (crossed)). In some cases, the polarization angle can be modified to a plurality of angles to facilitate capturing images of the sample illuminated with the first conditioned light at different angles. At block 812, an imaging device 504 such as a camera can be used to capture or acquire a first image of the sample. The operations disclosed in blocks 802-812 can be repeated with additional lamps and until a sufficient number of images (e.g., between 500 and 3000 images, or between 2000 and 3000 images) comprising surface normal information or data has been acquired to allow for three-dimensional reflective topography extraction and more. In some cases, 2,048 images may be acquired. Additionally, in the photometric imaging system 700 having a plurality of lamps (e.g., eight lamps), the order of operation of the lamps can occur in a user-defined order. For example, the lamps do not illuminate or emit light towards the sample at the same time, and the lamps can be turned on and off in sequential order (e.g., Lamp 1 is illuminated or turned on while all other lamps are off, then Lamp 1 is turned off and Lamp 2 is illuminated while all other lamps are off, and so on). However, alternative sequential orders may be possible.

In some cases, the polarizer 714 may be a linear polarizer that can be rotated to adjust the polarization angle. For example, while a first lamp is illuminating a sample, the linear polarizer can be rotated to different angles (e.g., eight different angles) and the same number of images can be acquired (e.g., capture an individual image for an individual angle). In some examples, the photometric imaging process 800 can further include adjusting an exposure time for the image acquisition. In some examples, a plurality of images may be acquired for a particular set of imaging conditions (e.g., a first exposure time and a first rotation angle of the linear polarizer) to improve a signal-to-noise ratio. In some cases, four images may be acquired for one particular set of imaging conditions.

In some cases, at least some operations of the photometric imaging process 800 may be instructions stored in a computer-readable medium that can instruct a processor (e.g., the processor 704) to cause elements of a lamp 100 or a lamp 200 to perform the operations. For example, operations associated with the blocks 802, 808, 810, and 812 may be performed by the processor 704 in response to executing instructions stored in a volatile or non-volatile memory.

In some cases, the photometric imaging system 700 can be calibrated. The calibration process may include calibrating a polarizer 714 with respect to a first lamp (e.g., a lamp 100 or lamp 200). During fabrication of the lamp 100, a linear polarizer film 216 is placed between an optically clear sheet 210 and an anti-reflective film 120. Although the linear polarizer film 216 is oriented and fixed in a position to vertically polarize the light of lamp 100, the alignment may vary a few degrees. To account for such variations, the imaging system including the lamp 100 can be calibrated by measuring an intensity of the light of lamp 100 (e.g., first light of the first lamp) as a function of a polarization viewing state of the polarizer 714. In some cases, the intensity of the light can be measured as the polarizer 714 is a relative to the linear polarizer film 216 of a lamp 100. The measured intensity can be analyzed by comparing it against an anticipated intensity value for the rotation angle of the linear polarizer, using Malus's law. In some examples, this calibration may be performed separately from the photometric imaging process 800, before the photometric imaging process 800, as a part of the photometric imaging process 800, or at any other time (e.g., during maintenance of a near-light imaging apparatus 500). Additionally, the brightness of the lamps relative to each other may be calibrated such that each lamp nominally has the same average brightness in the camera-viewed illumination area for equivalent lamp input brightness control values.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. An illuminator comprising:
a lamp comprising a plurality of light sources, wherein each light source of the plurality of light sources comprises a color temperature having an approximately constant value as a brightness of the light source is changed;
an edge-blending film to condition light emitted at an outer perimeter of the lamp to soften a light edge; and
a first light-shaping diffuser comprising a first diffusing angle to diffuse light emitted from an interior region of the lamp,
wherein the edge-blending film is between the plurality of light sources and the first light-shaping diffuser.

2. The illuminator of claim 1, wherein the edge-blending film comprises at least one of a dot pattern film or a gradient transmissive neutral density film.

3. The illuminator of claim 1, further comprising optical lenses disposed over the plurality of light sources, the optical lenses to generate an altered light distribution of an initial light distribution output by the plurality of light sources.

4. The illuminator of claim 1, further comprising a second light-shaping diffuser comprising a second diffusing angle, wherein the first diffusing angle is lower than the second diffusing angle, and wherein the second light-shaping diffuser diffuses light diffused by the first light-shaping diffuser.

5. The illuminator of claim 1, wherein the plurality of light sources comprises a plurality of light emitting diodes, and wherein the plurality of light emitting diodes comprises between 5 light emitting diodes and 200 light emitting diodes.

6. The illuminator of claim 1, wherein the color temperature is in a range between approximately 4,500 K and 10,000 K.

7. The illuminator of claim 6, wherein the plurality of light sources comprises a color rendering index having a value in a range between approximately 85% and 100%.

8. The illuminator of claim 1, further comprising a color neutral polarizer to facilitate a transmission of light from the plurality of light sources, wherein the color neutral polarizer is a linear polarizer film having a vertically oriented transmission axis, and wherein the first light-shaping diffuser is between the edge-blending film and the color neutral polarizer.

9. The illuminator of claim 1, further comprising an anti-reflective film on a front surface of the lamp, wherein light is transmitted from the lamp through the front surface.

10. A near-light apparatus, comprising:
a housing defining an inner volume;
a target area disposed within the inner volume, the target area to receive a sample; and
a first lamp positioned within the inner volume, the first lamp to emit an approximately uniform light towards a sample, the first lamp comprising:
a plurality of light sources;

an edge-blending film to condition light emitted at an outer perimeter of the first lamp to soften a light edge; and
a first light-shaping diffuser comprising a first diffusing angle to diffuse light emitted from an interior region of the first lamp.

11. The near-light apparatus of claim 10, further comprising a second lamp positioned within the inner volume, the second lamp to emit an approximately uniform light towards the sample, the second lamp comprising a second plurality of light sources, a second edge-blending film to condition light emitted at a second outer perimeter of the second lamp to soften a second light edge, and a second light-shaping diffuser comprising a second diffusing angle to diffuse light emitted from a second interior region of the second lamp, wherein the first lamp illuminates the sample from a first orientation and the second lamp illuminates the sample from a second orientation different from the first orientation, wherein the first lamp and the second lamp do not emit light towards the sample at a same time.

12. The near-light apparatus of claim 11, further comprising an imaging device to capture images of the sample illuminated by at least the first lamp and the second lamp, wherein the imaging device is parallel to an imaging axis perpendicular to the target area and placed a first distance away from the target area.

13. The near-light apparatus of claim 10, further comprising a controller to operate the first lamp at a first light setting, wherein the first light setting comprises at least one of an orientation of the first lamp and a brightness of the first lamp.

14. The near-light apparatus of claim 10, wherein the plurality of light sources comprises a plurality of light emitting diodes having an approximately constant color temperature, wherein the approximately constant color temperature is in a range of 4,500 K to 10,000 K.

15. The near-light apparatus of claim 10, wherein the housing comprises a first portion movably coupled to a second portion, wherein the first portion comprises the first lamp, an imaging device, wherein the housing further comprises an aperture to receive the second portion, wherein the second portion comprises a sample tray comprising the target area, and wherein the second portion is movable relative to the aperture to provide access to the sample tray when moved away from the aperture.

16. A photometric imaging system comprising:
a first lamp comprising:
a plurality of light sources comprising a color temperature having an approximately constant value as a brightness of the plurality of light sources is changed;
an edge-blending film to condition light emitted at an outer perimeter of the first lamp to soften a light edge; and
a first light-shaping diffuser comprising a first diffusing angle to diffuse light emitted from an interior region of the first lamp to illuminate a sample approximately uniformly;
an imaging device to capture images of the sample illuminated by the first lamp; and
a target area to receive the sample.

17. The photometric imaging system of claim 16, further comprising a controller to adjust a brightness of the first lamp based on a first light setting, wherein the first light setting corresponds to at least one of a brightness level and an orientation of the light to be emitted.

18. The photometric imaging system of claim 16, further comprising a controller to instruct the imaging device to capture a first image of the sample with a first light setting and a second image of the sample with a second light setting, wherein at least the first light setting is provided by the first lamp, and wherein the first light setting corresponds to at least one of an orientation and a brightness of the first lamp emitting light towards the sample.

19. The photometric imaging system of claim 16, further comprising a controller including a processor, wherein the controller allows for operation of the first lamp, and the imaging device to acquire image data of the sample, the controller to receive the image data and send the image data to the processor, the processor to obtain a plurality of properties of the sample to incorporate into a physically based rendering process.

20. The photometric imaging system of claim 16, wherein the target area is a removable target area relative to the imaging device.

* * * * *